A. O. GLAU.
RAKE.
APPLICATION FILED JULY 11, 1914.
1,128,130.
Patented Feb. 9, 1915.
2 SHEETS—SHEET 2.
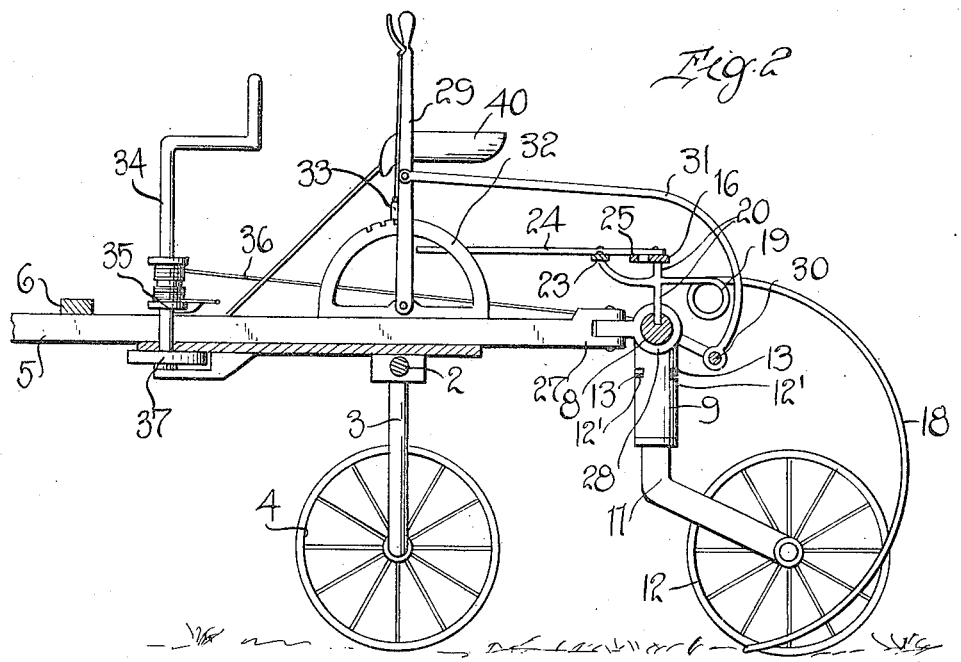
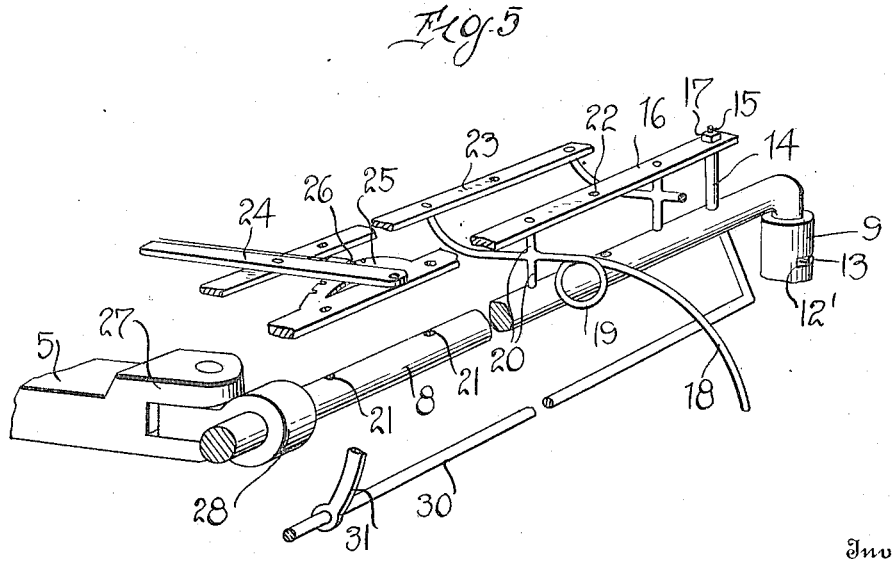
Witnesses
Inventor
A. O. GLAU
By Watson E. Coleman
Attorney

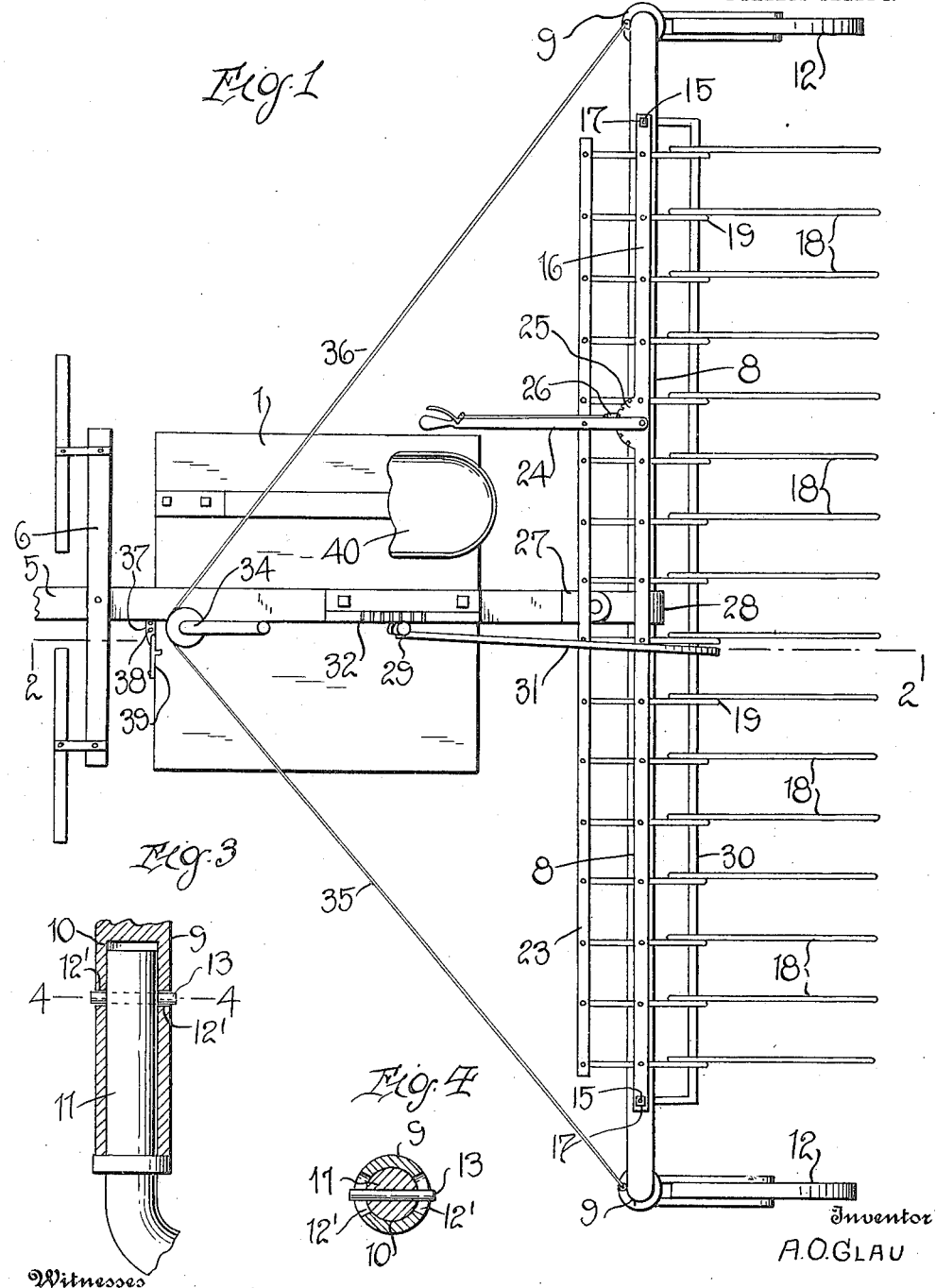

UNITED STATES PATENT OFFICE.

AUGUST O. GLAU, OF ABERDEEN, SOUTH DAKOTA.

RAKE.

1,128,130.

Specification of Letters Patent.

Patented Feb. 9, 1915.

Application filed July 11, 1914. Serial No. 850,478.

*To all whom it may concern:*

Be it known that I, AUGUST O. GLAU, a citizen of the United States, residing at Aberdeen, in the county of Brown and State of South Dakota, have invented certain new and useful Improvements in Rakes, of which the following is a specification, reference being had to the accompanying drawings.

This invention relates to new and useful improvements in rakes, and particularly to that class of rakes which are drawn over the ground to pile hay or similar grain in rows.

An object of this invention is the provision of a rake which will obviate the necessity of constantly dumping the hay from the rake to form rows which extend transversely across the field, the rake constructed in accordance with my invention being of such construction that the same can be set at an angle so that the hay may be moved to one side of the rake to form a row which extends the entire length of the field.

A further object of this invention is the provision of a rake which is set at an angle to pile the hay engaged by the rake to one side thereof in a row as the rake is drawn over the ground, means being provided to readily reverse the angle of the rake when the same is turned around, so that the hay may be moved to one side of the rake in the direction of the rows previously formed.

A still further object of this invention is the provision of novel means whereby the rake may be quickly and easily raised from the ground when it is desired to move the device from place to place or when the rake proper is not desired for use.

With these and other objects in view, my invention consists in the novel construction, combination, and arrangement of parts, to be hereinafter more fully described, claimed, and illustrated in the accompanying drawings, in which—

Figure 1 is a top plan view of my improved rake; Fig. 2 is a sectional view on the line 2—2 of Fig. 1; Fig. 3 is a vertical sectional view of one of the supporting members for the wheels of the rake; Fig. 4 is a sectional view on the line 4—4 of Fig. 3; and Fig. 5 is a fragmentary perspective view showing the manner of connecting the rake head and teeth to the axle.

Referring more particularly to the drawings, the numeral 1 designates a platform which has an axle 2 secured to its under face, the axle having downwardly offset stub axles 3 at its ends upon which supporting wheels 4 are mounted, the stub axles 3 being offset below the main portion of the axle to a distance sufficient to dispose the wheels 4 entirely below the platform. Connected to the platform and extending forwardly and rearwardly of the same is a pole 5, and pivotally connected to the pole forwardly of the platform are the draft animal attaching means 6, to which animals are connected for drawing the device over the ground. Disposed rearwardly of the platform is an axle 8, the opposite ends of which extend beyond the opposite sides of the platform to any desired distance. Mounted on the opposite ends of the axle are depending bearing members 9 in the lower ends of which circular recesses 10 are formed to receive the upwardly extending cylindrical shafts 11 of ground wheels 12 by which the axle is supported in spaced relation from the ground. Each of the bearing members is provided with elongated slots 12' therein on opposite sides of the recesses 10, to receive the opposite ends of pins 13 which project through the shafts 11, so that the wheels will only be disposed in the direction of movement of the device.

Projecting upwardly from the axle adjacent its opposite ends are stems 14, the upper ends of which are reduced and threaded as at 15 to support the opposite ends of a rake head 16, the rake head being secured upon the threaded ends 15 of the stems by the nuts 17. The rake head 16 of the axle is adapted to support a plurality of rake teeth 18, each of the teeth consisting of a resilient rod, the rear end of which is curved downwardly to provide a ground engaging portion, and being provided with a spring loop 19. Each tooth forwardly of the loop 19 is provided with upwardly and downwardly extending arms 20, the downwardly extending arms 20 of the teeth being rotatably mounted in recesses 21 in the axle, and the upwardly extending arms being rotatably mounted in openings 22 in the rake head, whereby the angle of the teeth with relation to the head may be adjusted. The forward ends of the rake teeth 18 are curved upwardly and are pivotally connected to an operating bar 23, and to simultaneously adjust the series of teeth, a lever 24 is pivotally connected at its inner end to the rake head 16, the lever being also pivotally connected adjacent its inner end to the bar 23, the head 16 having a rack 25 formed thereon, and the lever 24 carrying a pawl 26 for engagement with the rack whereby the bar and the teeth may be held in adjusted position.

The inner end of the pole is bifurcated as at 27, and pivotally mounted between the bifurcations of the pole is a bearing member 28 through which the axle 8 extends, and is rotatably supported therein. To rotate the axle 8 so as to move the rake teeth into or out of engagement with the ground, a lever 29 is pivotally connected at its lower end to the platform, and pivotally connected at one end to the lever and at its other end to a rod 30 which is disposed rearwardly of the axle and is provided with forwardly extending ends secured to the axle, is a connecting rod 31, whereby upon movement of the lever 29 the axle is rotated in the desired direction. To maintain the axle in adjusted position, a rack 32 is secured to the platform adjacent the pivotal point of the lever 29, the lever carrying a pawl 33 for engagement with the rack, whereby the lever may be maintained in a position to hold the head in any desired adjusted position. As the axle is supported in a bearing member which is pivotally connected to the rear end of the pole, the axle may be swung from side to side to adjust the angle of the head with relation to the direction of travel of the machine, and to adjust the angle of the head, a vertical crank 34 is rotatably mounted at its lower end in the platform 1, the forward ends of a pair of cables 35 and 36 being connected to the crank, the rear end of the cables being connected to the axle 8 at its opposite ends. Mounted on the lower end of the crank 34 which projects below the platform is a wheel 37 which projects at one side forwardly of the front edge of the platform, the wheel having a series of openings 38 formed therein, any one of the openings being adapted to receive a hook 39 which is pivotally connected to the forward edge of the platform, to hold the crank stationary. The cables 35 and 36 are wound upon the crank in reverse directions until both cables are taut, so that upon rotation of the crank to adjust the angle of the head, one of the cables is wound upon the crank while the other is unwound from the same whereby the axle is turned upon the pivot of the bearing member 28 to adjust the angle thereof. A suitable seat 40 is supported upon the platform, the seat being disposed in such position, that the levers 24 and 29, and the crank 34 may be easily and quickly operated by the person upon the seat.

In the practical use of the machine, the platform is supported upon the wheels 4 and the rake head is supported upon the wheels 12, and the machine is moved over the ground in the ordinary manner by the animals connected to the attaching device 6. The angle of the axle and the rake head 16 with relation to the direction of travel of the machine, is then adjusted, by rotation of the crank 34, to move the hay to one side of the rake head so that the hay is formed in a row extending the entire length of the field. The rake teeth are adjusted to face in the direction of travel of the machine, regardless of the angle of the rake head, so that all of the hay disposed in the path of the teeth will be engaged thereby and moved to one side of the machine. When the machine is turned at the end of the field, the rake head may be quickly adjusted to the reverse angle and the rake teeth also simultaneously adjusted to again point in the direction of travel of the machine so that the hay is rolled to the side of the machine toward the row or rows of hay previously formed. The ground engaging ends of the teeth may be readily moved from the ground by actuating the lever 29 to rotate the axle in the bearing member 28, and the teeth may be held in this position by engagement of the pawl 33 with the rack 32.

Having thus fully described my invention, what I desire to claim and secure by Letters Patent is:—

1. A device of the character described including a draft pole, a transversely extending axle carried by the rear end of the pole, supporting wheels connected to the opposite ends of the axle, a rake head supported above the axle, rake teeth pivotally mounted between the axle and the rake head, and means for simultaneously adjusting the angle of the rake teeth with relation to the direction of travel of the device.

2. A device of the character described including a draft pole, an axle pivotally connected to the rear end of the pole to swing in a horizontal plane, supporting wheels connected to the opposite ends of the axle, a rake head carried by the axle above the same, rake teeth pivotally mounted between the axle and the rake head, means for adjusting the angle of the axle with relation to the direction of movement of the device, and means for adjusting the angle of the rake teeth with relation to the axle and head.

3. A device of the character described including a draft pole, a transversely extending axle rotatably connected to the rear end of the pole, supporting wheels connected to the opposite ends of the axle, a rake head arranged above and supported by the axle, rake teeth having vertically extending arms adapted for pivotal engagement in said rake head and said axle, means for rotating the axle to raise or lower said teeth, and means for simultaneously adjusting the angle of the teeth with relation to the longitudinal plane of the pole.

4. A device of the character described comprising a wheeled platform, a pole mounted upon the platform and projecting rearwardly thereof, a bearing member pivotally connected to the rear end of the pole to swing in a horizontal plane, an axle rotatably mounted in the bearing member, a rake head spaced above and supported upon said axle, rake teeth mounted between and pivotally connected to said axle and said head, means for adjusting said rake teeth simultaneously, means for rotating said axle to raise and lower said rake teeth, and means for swinging said axle to adjust the angle of the same with relation to the longitudinal plane of the pole.

5. A device of the character described including a draft pole, a bearing member pivotally connected to the rear end of the pole for horizontal swinging movement, a transversely extending axle rotatably mounted in the bearing member, supporting wheels connected to the opposite ends of the axle, a rake head arranged above and supported by the axle, rake teeth supported between the axle and the head, means for swinging said axle to adjust the angle thereof with relation to the direction of travel of the device, and means for rotating said axle to raise and lower the rake teeth.

6. A device of the character described comprising a wheeled platform, a pole mounted on the platform and extending rearwardly thereof, a transversely extending axle rotatably connected to the rear end of the pole, a rake head arranged above and supported by said axle, rake teeth having upwardly and downwardly extending arms adapted for pivotal engagement in said rake head and said axle, an operating bar connected to the forward ends of said rake teeth, means for moving said operating bar whereby to simultaneously adjust the angle of said teeth with relation to the longitudinal plane of the pole, and means for rotating said axle to raise and lower said teeth.

In testimony whereof I hereunto affix my signature in the presence of two witnesses.

AUGUST O. GLAU.

Witnesses:
 G. N. WILLIAMSON,
 JOHN HEBERER.